US012809407B2

(12) United States Patent
Kamiya et al.

(10) Patent No.: US 12,809,407 B2
(45) Date of Patent: Nov. 24, 2026

(54) ELECTRONIC APPARATUS AND CONTROL METHOD

(71) Applicant: CANON KABUSHIKI KAISHA, Tokyo (JP)

(72) Inventors: Jun Kamiya, Kanagawa (JP); Yasuhito Takaki, Kanagawa (JP); Yuji Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 418 days.

(21) Appl. No.: 18/539,508

(22) Filed: Dec. 14, 2023

(65) Prior Publication Data

US 2024/0201716 A1 Jun. 20, 2024

(30) Foreign Application Priority Data

Dec. 20, 2022 (JP) ................................ 2022-203531

(51) Int. Cl.
*G05D 23/19* (2006.01)
*G06F 1/20* (2006.01)

(52) U.S. Cl.
CPC ......... *G05D 23/1917* (2013.01); *G06F 1/203* (2013.01)

(58) Field of Classification Search
CPC ...... G06F 1/206; G03B 17/55; H04N 17/002; H04N 23/651; H04N 23/667
See application file for complete search history.

(56) References Cited

U.S. PATENT DOCUMENTS

2012/0189265 A1* 7/2012 Okazaki ................ H04N 5/772 386/E5.069
2013/0037533 A1* 2/2013 Namekawa ........... H04N 23/60 374/102
2015/0006937 A1* 1/2015 Rotem ................. G06F 1/3215 713/324
2015/0057830 A1* 2/2015 Slaby ..................... G06F 1/324 700/300
2018/0267389 A1* 9/2018 Kayano ................. G03B 27/72

FOREIGN PATENT DOCUMENTS

JP 2007028425 A * 2/2007
JP 2013-044966 A 3/2013

* cited by examiner

*Primary Examiner* — Mohammad Ali
*Assistant Examiner* — Dhruvkumar Patel
(74) *Attorney, Agent, or Firm* — Cowan, Liebowitz & Latman, P.C.

(57) ABSTRACT

An electronic apparatus includes first, second and third thermometers each of which detects any one of first, second and third ambient temperatures in an environment in which the electronic apparatus is used, and a control unit that estimates an ambient temperature based on the first ambient temperature and the second ambient temperature, and restricts an operation of the electronic apparatus in a case where the outer casing temperature has reached a threshold that has been set based on the estimated ambient temperature. The control unit sets a temperature of the threshold in a second operation mode at a temperature higher than a temperature of the threshold in a first operation mode, the second operation mode causing a small temperature increase in the electronic apparatus compared to the first operation mode.

16 Claims, 5 Drawing Sheets

ELECTRONIC APPARATUS AND CONTROL METHOD

BACKGROUND OF THE INVENTION

Field of the Invention

The present invention relates to a technique to control operations based on the temperature of an electronic apparatus.

Description of the Related Art

In an electronic apparatus such as a digital camera, as the load on image capture processing and image processing increases due to, for example, shooting of high-definition images, electronic components (hereinafter, heat source devices) that constitute an image capturing unit, a control unit, and the like generate heat during shooting, and the temperatures of the inside and the outer casing of the device increase. For this reason, it is necessary to perform control to restrict operations of the electronic apparatus so as not to exceed a temperature at which operations of the heat source devices are guaranteed, and to restrict operations of the electronic apparatus so that the temperature of the outer casing, which is touched directly by a user, does not rise excessively.

Also, in a case where the operations of the electronic apparatus are restricted based on the temperature of the outer casing, it is necessary to appropriately set a threshold for the outer casing temperature (hereinafter, an outer casing temperature threshold) that restricts the operations of the electronic apparatus based on the ambient temperature of the environment in which the electronic apparatus is used. Furthermore, in order to set an appropriate outer casing temperature threshold, it is necessary to obtain an accurate ambient temperature. In addition, in a case where an accurate ambient temperature cannot be obtained, there is also a method in which a lower temperature is set as the outer casing temperature threshold to restrict the operations of the electronic apparatus based on a lower temperature. However, restricting the operations of the electronic apparatus based on a lower temperature causes, for example, an inconvenience of reduction of a time period in which the electronic apparatus is operable.

It is described in Japanese Patent Laid-Open No. 2013-44966 that, in a case where the temperature of the inside of the device has reached a predetermined upper limit temperature, a user is notified of the necessity of a transition to an operation mode that suppresses a temperature increase of the device, and an operation mode that reduces a temperature increase is executed in accordance with a user operation.

However, according to Japanese Patent Laid-Open No. 2013-44966, an operational restriction based on the ambient temperature or the outer casing temperature of the device is not implemented; in a case where an operational restriction is implemented based on the internal temperature of the device, it is not possible to execute an operation that does not affect an increase in the ambient temperature or the outer casing temperature of the device.

SUMMARY OF THE INVENTION

The present invention has been made in consideration of the aforementioned problems, and realized techniques to, even in a case where operations in one mode have been restricted due to a temperature increase of an electronic apparatus, enable operations in another mode that is not likely to affect a temperature increase.

In order to solve the aforementioned problems, the present invention provides an electronic apparatus comprising: a first thermometer that detects a first ambient temperature in an environment in which the electronic apparatus is used; a second thermometer that detects a second ambient temperature in the environment in which the electronic apparatus is used; a third thermometer that detects an outer casing temperature of the electronic apparatus; a CPU; and a memory which stores a program which, when executed by the CPU, causes the electronic apparatus to function as: a control unit that estimates an ambient temperature based on the first ambient temperature and the second ambient temperature, and restricts an operation of the electronic apparatus in a case where the outer casing temperature has reached a threshold that has been set based on the estimated ambient temperature, wherein the control unit sets a temperature of the threshold in a second operation mode at a temperature higher than a temperature of the threshold in a first operation mode, the second operation mode causing a small temperature increase in the electronic apparatus compared to the first operation mode.

In order to solve the aforementioned problems, the present invention provides a control method for an electronic apparatus, the electronic apparatus including: a first thermometer that detects a first ambient temperature in an environment in which the electronic apparatus is used; a second thermometer that detects a second ambient temperature in the environment in which the electronic apparatus is used; and a third thermometer that detects an outer casing temperature of the electronic apparatus, the control method comprising: estimating an ambient temperature based on the first ambient temperature and the second ambient temperature, and restricting an operation of the electronic apparatus in a case where the outer casing temperature has reached a threshold that has been set based on the estimated ambient temperature, wherein in the restricting, a temperature of the threshold in a second operation mode is set at a temperature higher than a temperature of the threshold in a first operation mode, the second operation mode causing a small temperature increase in the electronic apparatus compared to the first operation mode.

In order to solve the aforementioned problems, the present invention provides a non-transitory computer-readable storage medium storing a program for causing a computer to function as an electronic apparatus comprising: a first thermometer that detects a first ambient temperature in an environment in which the electronic apparatus is used; a second thermometer that detects a second ambient temperature in the environment in which the electronic apparatus is used; a third thermometer that detects an outer casing temperature of the electronic apparatus; a control unit that estimates an ambient temperature based on the first ambient temperature and the second ambient temperature, and restricts an operation of the electronic apparatus in a case where the outer casing temperature has reached a threshold that has been set based on the estimated ambient temperature, wherein the control unit sets a temperature of the threshold in a second operation mode at a temperature higher than a temperature of the threshold in a first operation mode, the second operation mode causing a small temperature increase in the electronic apparatus compared to the first operation mode.

According to the present invention, even in a case where operations in one mode have been restricted due to a temperature increase of an electronic apparatus, operations in another mode that is not likely to affect a temperature increase can be performed.

Further features of the present invention will become apparent from the following description of exemplary embodiments (with reference to the attached drawings).

DESCRIPTION OF THE EMBODIMENTS

Figure 1A:
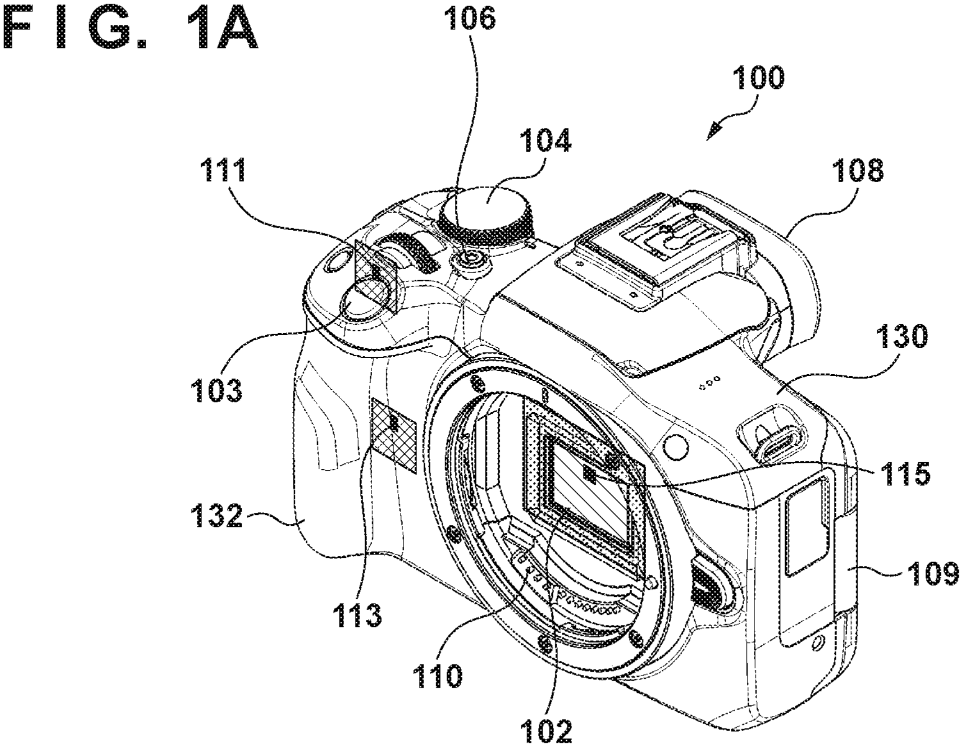
FIGS. 1A and 1B are external views of an electronic apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiments will be described in relation to a case where an electronic apparatus of the present invention is a hand-held type image capture apparatus, such as a digital camera. Note that the electronic apparatus of the present invention is not limited to the digital camera, and an application to a hand-held type electronic apparatus including a device that acts as a heat source, such as a personal computer (a notebook PC or a tablet PC) and a smartphone, is possible.

<Apparatus Configuration>

A configuration and functions of a digital camera 100 according to a present embodiment will be described with reference to FIG. 1A to FIG. 2.

Figure 1B:
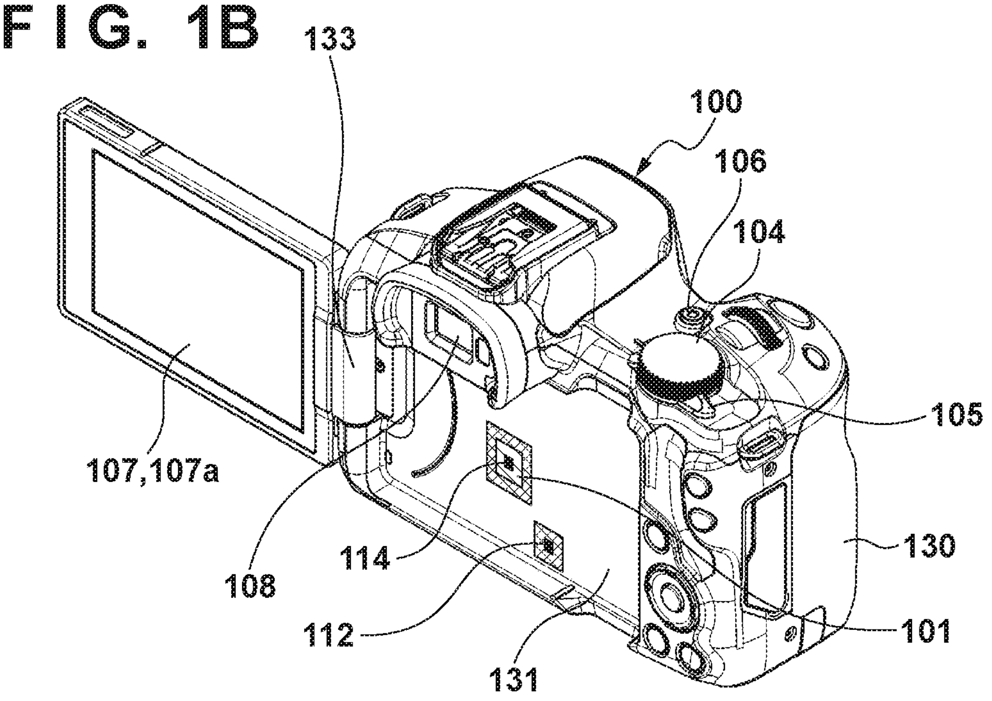
Figure 2:
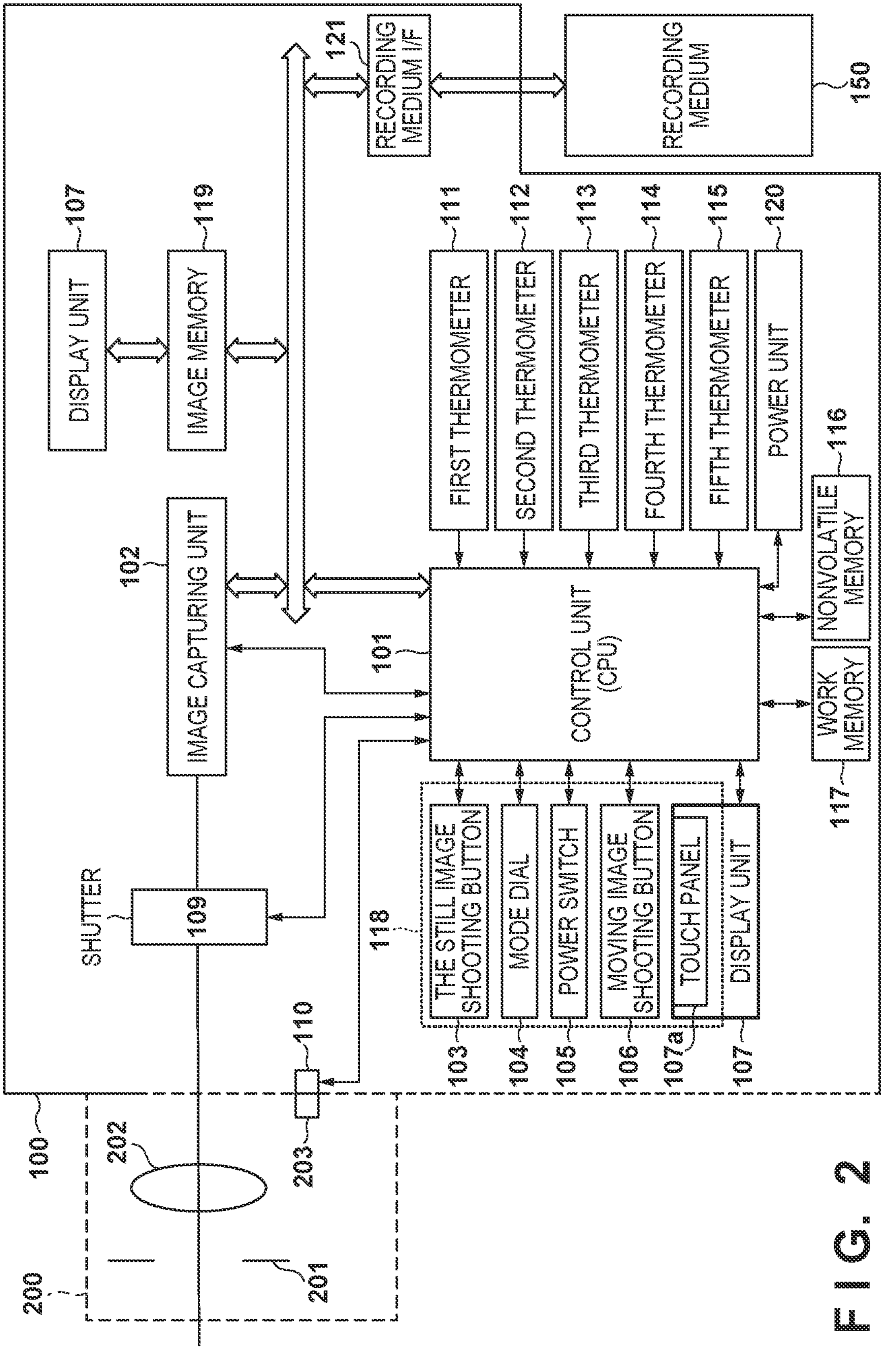
FIG. 2 is a block diagram showing a configuration of the electronic apparatus according to the present embodiment.

FIG. 1A is a front perspective view of the digital camera 100 in a state where a lens unit 200 has been detached, and FIG. 1B is a rear perspective view of the digital camera 100.

The digital camera 100 includes a control unit 101 and an image capturing unit 102 that are mounted on a substrate arranged inside a housing of a camera body 130, a still image shooting button 103, a mode dial 104, a power switch 105, a moving image shooting button 106, a display unit 107, and an eyepiece unit 108 that are arranged on an outer casing of the camera body 130. Furthermore, the digital camera 100 includes a first thermometer 111, a second thermometer 112, a third thermometer 113, a fourth thermometer 114, and a fifth thermometer 115.

The control unit 101 includes a processor that executes computational processing and control processing related to the digital camera 100, such as a CPU. The image capturing unit 102 is an image sensor comprised of an image capturing element that converts a subject image into electrical signals, such as a CCD and a CMOS.

The still image shooting button 103 is a push-button operation member for issuing an instruction for still image shooting processing to the control unit 101.

The mode dial 104 is a rotary operation member for switching among various types of modes. The mode dial 104 can switch from a plurality of operation modes of the control unit 101 to a still image shooting mode or a moving image shooting mode.

The power switch 105 is a rotary operation member that switches between ON and OFF of the power of the digital camera 100.

The moving image shooting button 106 is a push-button operation member for issuing an instruction for starting or stopping moving image shooting processing (recording processing) to the control unit 101. The control unit 101 starts the moving image shooting processing in response to initial pressing of the moving image shooting button 106, and continues the moving image shooting processing until the moving image shooting button 106 is pressed again. Also, the control unit 101 stops the moving image shooting processing when the moving image shooting button 106 is pressed again, and records moving images corresponding to a time period from the start to the stop of the shooting processing into a recording medium 150.

The display unit 107 includes, for example, a liquid crystal panel or an organic EL panel provided on a rear surface side of the camera body 130, and displays images and various types of information so that they can be viewed by a user. The display unit 107 has an electronic viewfinder (EVF) function that displays live-view images captured by the image capturing unit 102. Furthermore, the display unit 107 has an electronic viewfinder (EVF) function that reproduces shot still images and displays moving images that are currently recorded. The display unit 107 is a vari-angle monitor which is rotatably connected to the camera body 130 via a hinge unit 133, and which is positionally variable relative to the camera body 130. The user can freely change the direction and angle of, or rotate, a display surface of the vari-angle monitor relative to the digital camera 100. Note that the display unit 107 is not limited to the above-described vari-angle type, and may be of a tilt type which allows rotation in an up-down direction (around a horizontal axis perpendicular to an optical axis) using the hinge unit 133 as a rotation shaft, and which allows the display surface to tilt relative to a vertical direction.

FIG. 1A shows a state where the display unit 107 is at a "closed position". The "closed position" is a stored form where the display surface of the display unit 107 has been closed so as to face a rear surface cover 131 of the camera body 130. FIG. 1B shows a state where the display unit 107 is at an "open position". The "open position" is an open form where the display unit 107 has been opened toward the outside of the camera body 130 from the "closed position", and the display surface faces the same direction as the rear surface cover 131 of the camera body 130 (a direction opposite to the non-illustrated lens unit).

Furthermore, the display unit 107 includes a touch panel 107*a*. The touch panel 107*a* includes a touch sensor capable of detecting a contact (a touch operation) made on the display surface of the display unit 107 (an operation surface of the touch panel 107*a*).

The eyepiece unit 108 is a look-through type eyepiece viewfinder. Via the eyepiece unit 108, the user can confirm the focus and composition of a subject in an image captured by the image capturing unit 102.

A communication terminal 110 is an electrical contact point that is intended for the digital camera 100 to communicate with the later-described lens unit 200.

The first thermometer 111 detects a first ambient temperature T1 in an environment in which the camera body 130 is used. The first thermometer 111 includes a temperature sensor such as a thermistor. The first thermometer 111 is arranged at a first position distanced from the control unit 101 and the image capturing unit 102, which are heat-generating devices (hereinafter, heat source devices) arranged inside the housing of the camera body 130 (e.g., in the vicinity of the still image shooting button 103).

The second thermometer 112 detects a second ambient temperature T2 in an environment in which the camera body 130 is used. The second thermometer 112 includes a temperature sensor such as a thermistor. The second thermometer 112 is arranged at a second position distanced from the control unit 101 and the image capturing unit 102, which are the heat source devices arranged inside the housing of the camera body 130 (e.g., on the inner surface side of the rear surface cover 131 of the camera body 130).

The first thermometer 111 is arranged at a position that is at a farther distance from the control unit 101 and the image capturing unit 102, which are the heat source devices, than the second thermometer 112 is.

The third thermometer 113 detects an outer casing temperature T3 of the camera body 130. The third thermometer 113 includes a temperature sensor such as a thermistor. The third thermometer 113 is arranged so that a correlation can be attained between the outer casing temperature T3 and the temperature of a position that exhibits the highest temperature due to heat generation of the heat source devices in a section in which the user touches the camera body 130 to hold the digital camera 100. For example, the third thermometer 113 is arranged in the vicinity of a grip 132.

The fourth thermometer 114 and the fifth thermometer 115 are device temperature detection sensors that detect device temperatures associated with heat generation of the heat source devices.

The fourth thermometer 114 detects a fourth device temperature T4, which is the temperature of the control unit 101 that represents a heat source device. The fourth thermometer 114 includes a temperature sensor such as a thermistor. The fourth thermometer 114 is mounted on a substrate which is arranged inside the housing of the camera body 130 and on which the control unit 101 is mounted. The fourth thermometer 114 is arranged in the vicinity of the control unit 101. The temperature T4 detected by the fourth thermometer 114 increases with heat generation of the control unit 101 that represents a heat source device.

The fifth thermometer 115 detects a fifth device temperature T5, which is the temperature of the image capturing unit 102 that represents a heat source device. The fifth thermometer 115 includes a temperature sensor such as a thermistor. The fifth thermometer 115 is arranged inside the housing of the camera body 130, and in the vicinity of the image capturing unit 102. The temperature T5 detected by the fifth thermometer 115 increases with heat generation of the image capturing unit 102 that represents a heat source device.

The amounts of heat generation of the control unit 101 and the image capturing unit 102 are proportional to power consumed by the control unit 101 and the image capturing unit 102. Power consumed by the control unit 101 and the image capturing unit 102 varies depending on an operation mode of the digital camera 100. For example, power consumed during shooting of moving images at a high frame rate (e.g., 120 fps) is higher than power consumed during shooting of moving images at a low frame rate (e.g., 60 fps). Therefore, the amounts of heat generation of the heat source devices during shooting of moving images at a high frame rate are larger than those during shooting of moving images at a low frame rate. Also, during shooting of moving images, the temperature inside the housing of the digital camera 100 increases with the elapse of time. Furthermore, during shooting of still images, consumed power is low and the amounts of heat generation of the heat source devices are small compared to those during shooting of moving images at a high frame rate, although they vary depending on, for example, the recording size (file format) of shot images, the frame speed in continuous shooting, and the number of continuously-shot images. In addition, during shooting of still images, the temperature inside the housing of the camera body 130 of the digital camera 100 barely increases.

Next, internal configurations of the digital camera 100 and the lens unit 200 according to the present embodiment will be described with reference to FIG. 2. In FIG. 2, constituents that are the same as those in FIGS. 1A and 1B are given the same reference signs thereas.

The lens unit 200 includes a diaphragm 201 and a shooting lens 202, and is attachable to and detachable from the digital camera 100. Although the shooting lens 202 is normally comprised of a plurality of lenses, it is illustrated here as only one lens for the sake of simplicity.

A communication terminal 203 is an electrical contact point that is intended for the lens unit 200 to communicate with the digital camera 100. The communication terminal 203 of the lens unit 200 is electrically connected to the communication terminal 110 of the digital camera 100 in a state where the lens unit 200 is attached to the camera body 130 of the digital camera 100. The control unit 101 of the digital camera 100 controls the diaphragm 201 and the shooting lens 202 by communicating with the lens unit 200 via the communication terminals 110 and 203.

The control unit 101 realizes each type of processing of a later-described flowchart by executing a program stored in a nonvolatile memory 116. A working memory 117 is a RAM or the like; for example, constants and variables for the operations of the control unit 101 and the program read out from the nonvolatile memory 116 are loaded thereto.

A focal-plane shutter 109 is capable of freely controlling an exposure time period of the image capturing unit 102 in accordance with an instruction from the control unit 101.

The nonvolatile memory 116 is, for example, an electrically erasable and recordable EEPROM or the like. Constants for the operations of the control unit 101, the program, and the like are stored in the nonvolatile memory 116. The program according to the present embodiment refers to a program for executing the flowchart that is described later using FIG. 5.

Also, the control unit 101 executes predetermined pixel interpolation, resize processing such as reduction, and color conversion processing with respect to image data captured by the image capturing unit 102. Furthermore, the control unit 101 executes computational processing using image data captured by the image capturing unit 102, and performs automatic exposure (AE) control and autofocus (AF) control based on the result of the computation.

In the still image shooting mode, the control unit 101 starts the AE control and the AF control when the still image shooting button 103 has been pressed halfway, and executes still image shooting processing, which is recording of image data captured by the image capturing unit 102 into the recording medium 150, when the still image shooting button 103 has been fully pressed.

Furthermore, in the moving image shooting mode, the control unit 101 performs the AE control and the AF control with respect to image data (frames) captured by the image capturing unit 102 and continues moving image shooting processing, which is recording of moving images of a predetermined time period into the recording medium 150, in response to initial pressing of the moving image shooting button 106, and stops the moving image shooting processing when the moving image shooting button 106 is pressed again.

An operation unit 118 represents operation members, such as various types of switches and buttons, that accept various types of operations from the user and provide notifications to the control unit 101. The operation unit 118 includes at least the still image shooting button 103, the mode dial 104, the power switch 105, the moving image shooting button 106, and the touch panel 107*a*.

An image memory 119 stores image data captured by the image capturing unit 102 and data for image display, which is to be displayed on the display unit 107 or the eyepiece unit 108. The image memory 119 has a storage capacity that is sufficient to store a predetermined number of still images, and moving images and audio of a predetermined time period.

A power unit 120 is comprised of a primary battery such as an alkaline battery and a lithium battery, a secondary battery such as a NiCd battery, a NiNM battery, and a Li-ion battery, or the like. A recording medium I/F 121 is an interface with the recording medium 150, which is a memory card, a hard disk, or the like. The recording medium 150 is a recording medium, such as a memory card, for recording still images or moving images in the still image shooting processing or the moving image shooting processing, and is comprised of a semiconductor memory, a magnetic disk, or the like.

<Method of Calculating Estimated Ambient Temperature Tout>

Next, a method of calculating an estimated ambient temperature Tout based on the first ambient temperature T1 and the second ambient temperature T2 will be described with reference to FIG. 3.

Figure 3:
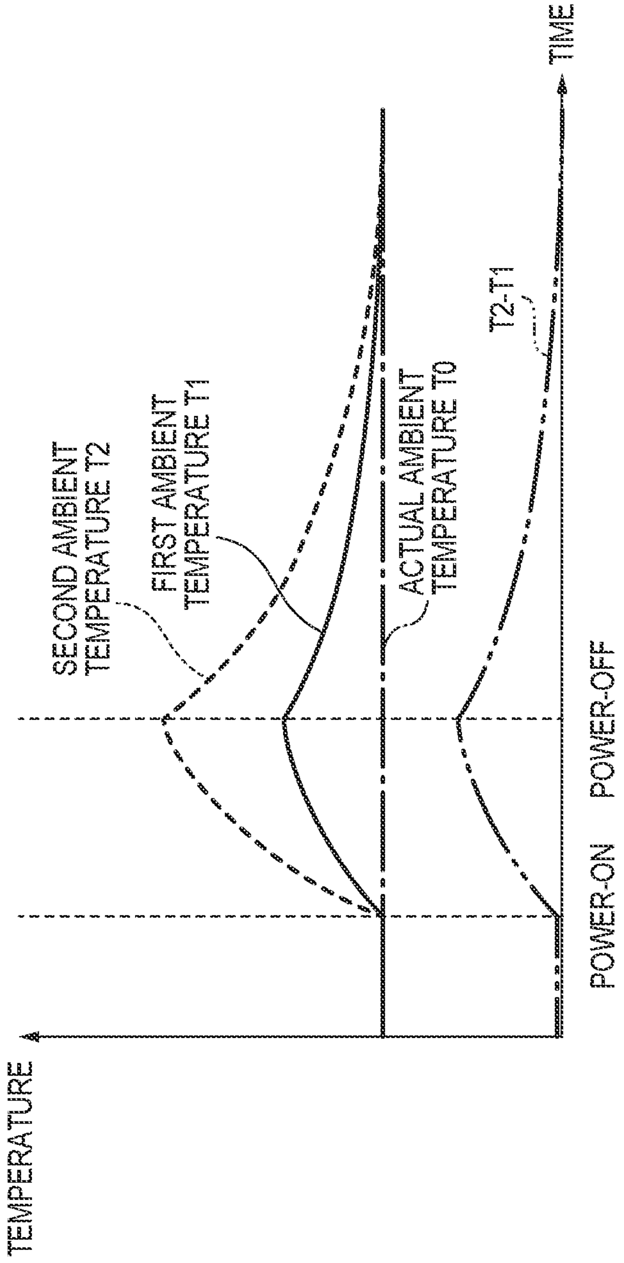
FIG. 3 is a diagram illustrating a method of calculating an estimated ambient temperature according to the present embodiment.

FIG. 3 is a diagram illustrating the method of calculating the estimated ambient temperature Tout from the first ambient temperature T1 and the second ambient temperature T2 according to the present embodiment.

FIG. 3 exemplarily shows changes in the statuses of an actual ambient temperature T0, the first ambient temperature T1 detected by the first thermometer 111, the second ambient temperature T2 detected by the second thermometer 112, and a difference between the first ambient temperature T1 and the second ambient temperature T2 (T1−T2).

It is assumed that the actual ambient temperature T0 (a dash-dot line) is constant until the power of the digital camera 100 is turned ON, and the first ambient temperature T1 (a solid line) and the second ambient temperature T2 (a dot line) are the same as the actual ambient temperature T0 until the power is turned ON.

Next, when the power of the digital camera 100 has been switched from OFF to ON, the digital camera 100 executes activation processing. As the control unit 101 and the image capturing unit 102, which are the heat source devices, start operating in the activation processing, the temperature inside the housing of the camera body 130 starts to rise in the digital camera 100.

The second thermometer 112 is arranged at a position that is closer to the control unit 101 and the image capturing unit 102, which are the heat source devices, than the first thermometer 111 is. Therefore, the gradient of temperature increase of the second ambient temperature T2 detected by the second thermometer 112 is greater than the gradient of temperature increase of the first ambient temperature T1 detected by the first thermometer 111. Therefore, the second ambient temperature T2 is higher than the first ambient temperature T1 when the power is turned OFF.

Next, when the power of the digital camera 100 has been switched from ON to OFF, the digital camera 100 executes shutdown processing. In the shutdown processing, the control unit 101 and the image capturing unit 102, which are the heat source devices, stop operating, and the temperature inside the housing of the camera body 130 starts to decrease in the digital camera 100. In this case, the difference between the first ambient temperature T1 and the actual ambient temperature TO and the difference between the second ambient temperature T2 and the actual ambient temperature TO decrease with the elapse of time since the power-OFF.

In FIG. 3, the change in the status of the difference between the first ambient temperature T1 and the second ambient temperature T2 (T2−T1) is indicated by a dash-dot-dot line. In the present embodiment, the first thermometer 111 and the second thermometer 112 are arranged inside the housing of the camera body 130 of the digital camera 100 so that "the second ambient temperature T2−the first ambient temperature T1" and "the first ambient temperature T1−the actual ambient temperature T0" are in a proportional relationship after the power-OFF.

The estimated ambient temperature Tout after the power-OFF is calculated using the following expression 1.

$$\text{Estimated ambient temperature } T\text{out}=\text{first ambient temperature } T1-\alpha\cdot(\text{second ambient temperature } T2-\text{first ambient temperature } T1) \qquad \text{(Expression 1)}$$

In the above expression 1, α is a coefficient, and is determined by, for example, actually measuring the changes in the first ambient temperature T1 and the second ambient temperature T2 after the power-OFF. In the present embodiment, α is set at 1.

As described above, the estimated ambient temperature Tout can be calculated using the first ambient temperature T1 and the second ambient temperature T2.

<Changes in Statuses of Device Temperatures T4 and T5 and Outer Casing Temperature T3>

Next, the changes in the statuses of the fourth device temperature T4, the fifth device temperature T5, and the outer casing temperature T3 during shooting of moving images on the digital camera 100 will be described with reference to FIGS. 4A and 4B.

Figure 4A:
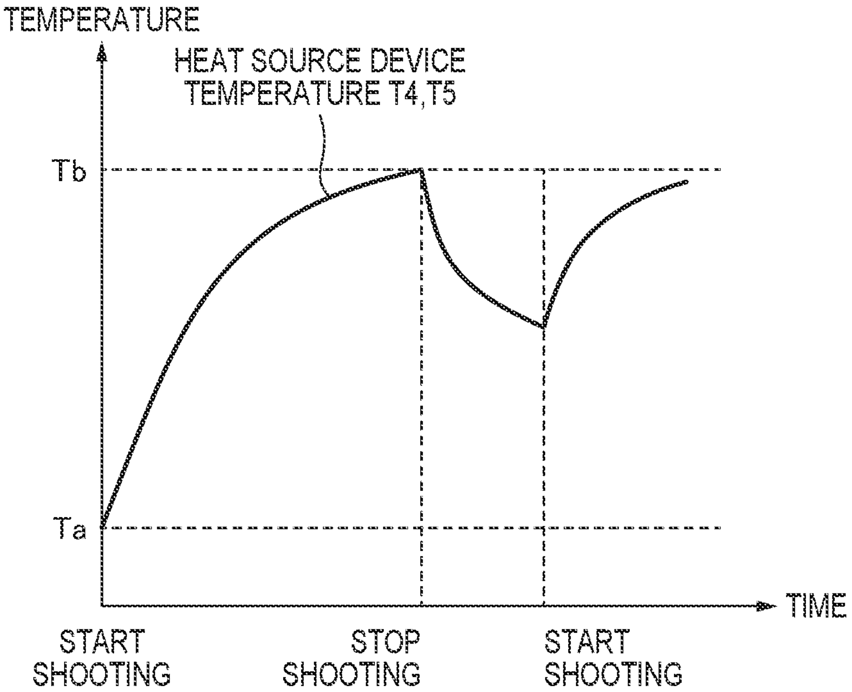
FIGS. 4A and 4B are diagrams illustrating changes in the statuses of heat source device temperatures and an outer casing temperature according to the present embodiment.
Figure 4B:
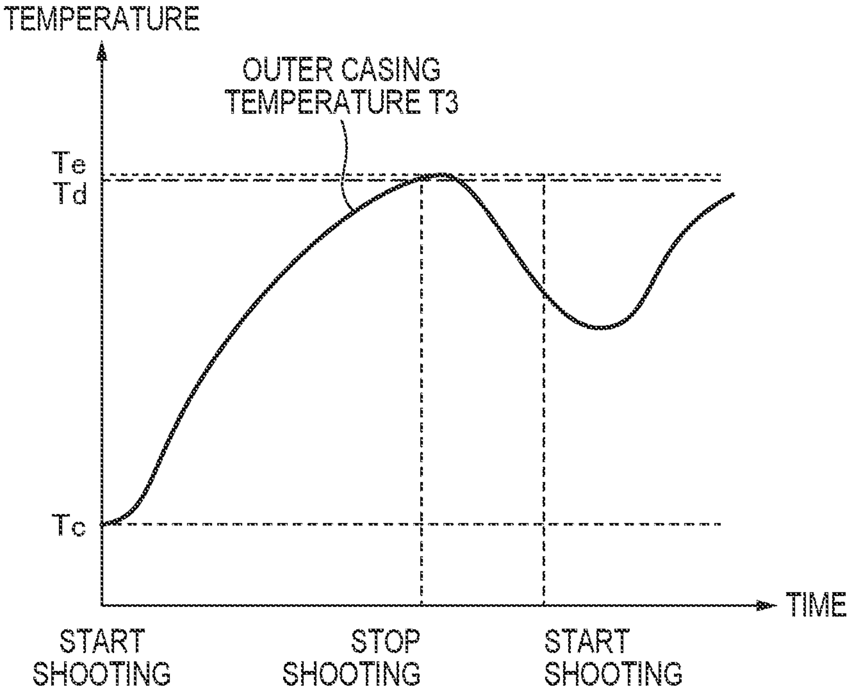

FIGS. 4A and 4B exemplarily show the changes in the statuses of the device temperatures T4 and T5 and the outer casing temperature T3 in a case where the digital camera 100 has repeated the start and stop of shooting of moving images.

FIG. 4A exemplarily shows the change in the status of the fifth device temperature T5 detected by the fifth thermometer 115 arranged in the vicinity of the image capturing unit 102, as the changes in the statuses of the device temperatures T4 and T5. FIG. 4B exemplarily shows the change in the status of the outer casing temperature T3 detected by the third thermometer.

In the example of FIG. 4A, the fifth device temperature T5 exhibits a tendency to start rising rapidly from the temperature Ta at the start of shooting, and decrease rapidly after reaching a peak temperature Tb when shooting is stopped.

Also, in the example of FIG. 4B, the outer casing temperature T3 exhibits a tendency to start rising gradually from the temperature Tc at the start of shooting, with a progressively increasing gradient of temperature increase. Furthermore, the outer casing temperature T3 exhibits a tendency where it is still at the temperature Td lower than the peak temperature Te when shooting is stopped, but the temperature increase continues for a while after shooting is stopped, and the temperature decreases gradually after reaching the peak temperature Te. The reason for the tendency shown in FIG. 4B is that, as the outer casing portion of the camera body 130 in which the third thermometer 113 is arranged is distanced from the heat source devices inside the housing, there is a delay in transmission of the heat generated by the heat source devices.

As described above, the outer casing temperature T3 has a tendency where the temperature increase continues even after the heat source devices have stopped operating. Therefore, in a case where the operations of the heat source devices are restricted when the outer casing temperature T3 has reached the upper limit temperature Td (e.g., in a case where the operations are stopped through the shutdown processing), after the outer casing temperature T3 has reached the upper limit temperature Td, the operations cannot be resumed until the outer casing temperature T3 falls below the temperature Td with the elapse of time.

On the other hand, power consumed by the digital camera 100 varies depending on an operation mode; for example, during shooting of moving images at a high frame rate, consumed power is higher than power consumed during shooting of moving images at a low frame rate, and the amounts of heat generation of the heat source devices are also large. Furthermore, during shooting of still images, consumed power is low and the amounts of heat generation of the heat source devices are small compared to those during shooting of moving images at a high frame rate, although they vary depending on, for example, the recording size (file format) of shot images, the frame speed in continuous shooting, and the number of continuously-shot images; in addition, the temperature inside the housing of the camera body 130 of the digital camera 100 barely increases.

In the present embodiment, the temperature of the outer casing of the digital camera 100 is detected. When this temperature of the outer casing has reached a threshold, the operations of the digital camera 100 are restricted. Furthermore, the ambient temperature is estimated, and the temperature of the threshold is determined in accordance with the ambient temperature.

Also, in the present embodiment, the threshold for the outer casing temperature T3 (hereinafter, an outer casing temperature threshold) for restricting the operations of the digital camera 100 is set for each of the operation modes of the digital camera 100. The operation modes include a first operation mode and a second operation mode. The outer casing temperature threshold in the first operation mode and the outer casing temperature threshold in the second operation mode are set at different temperatures. In the second operation mode, power consumed by the heat source devices is lower than that in the first operation mode. Even if the operations are continued in the second operation mode, they have a small effect on the temperature increase of the outer casing temperature T3 and heat generation of the heat source devices. In view of this, the outer casing temperature threshold in the second operation mode is set at a temperature higher than the outer casing temperature threshold in the first operation mode. In this way, even in a case where the operations have been restricted as a result of the outer casing temperature T3 reaching the outer casing temperature threshold in the first operation mode, the operations can be executed in the second operation mode. For example, assume that the moving image shooting mode is the first operation mode, and the still image shooting mode is the second operation mode. The outer casing temperature threshold in the moving image shooting mode and the outer casing temperature threshold in the still image shooting mode are set at different temperatures. The outer casing temperature threshold in the still image shooting mode is set at a temperature higher than the outer casing temperature threshold in the moving image shooting mode; even in a case where the operations have been restricted as a result of reaching the outer casing temperature threshold during shooting of moving images, shooting of still images can be executed.

<Control Processing>

Figure 5:
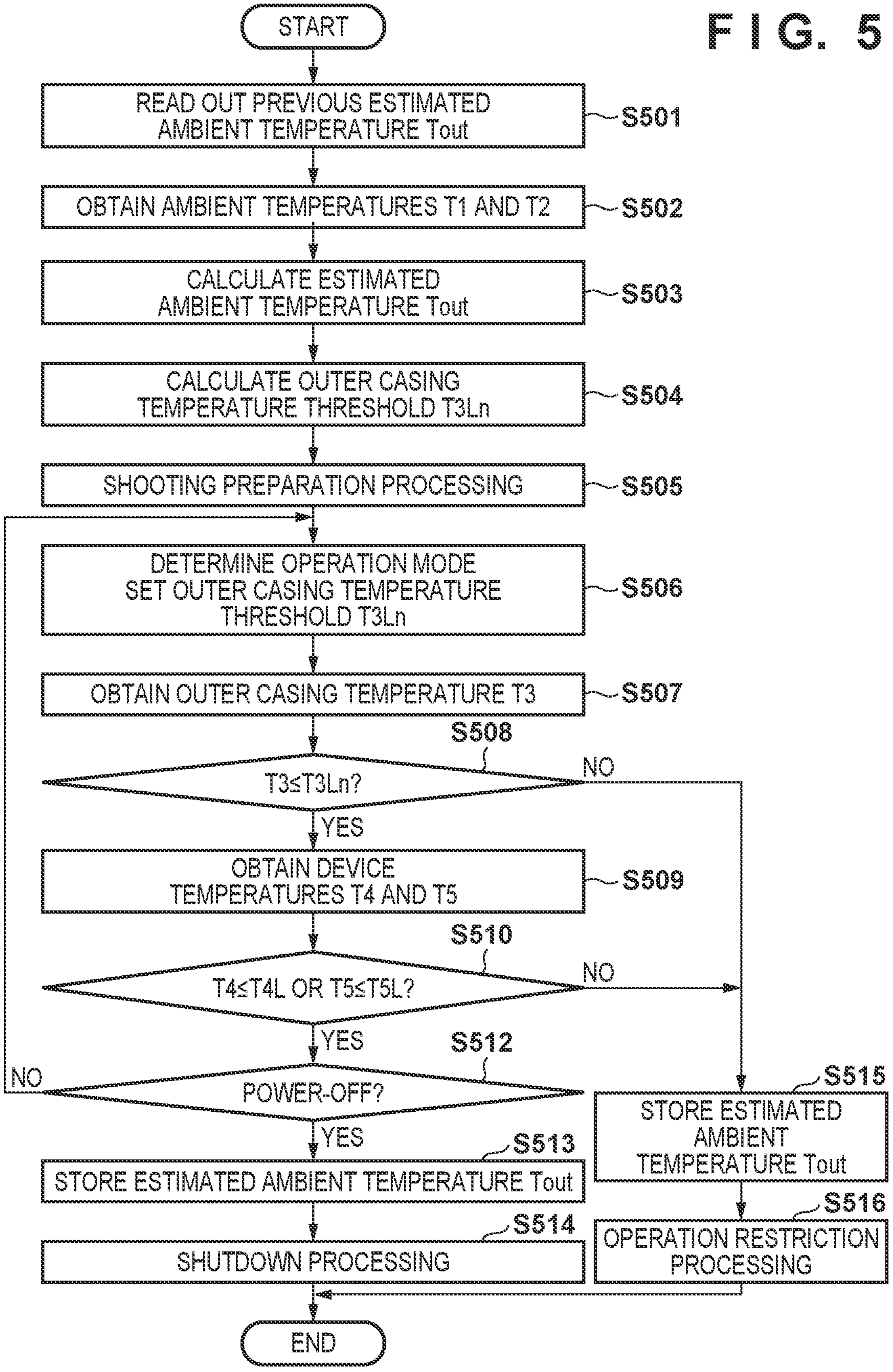
FIG. 5 is a flowchart showing processing for controlling operations of the electronic apparatus according to the present embodiment.

Next, with reference to FIG. 5, a description is given of processing for controlling the operations of the digital camera 100 based on the estimated ambient temperature Tout, the outer casing temperature T3, and the device temperatures T4 and T5 according to the present embodiment.

FIG. 5 is a flowchart showing the processing for controlling the operations of the digital camera 100 based on the estimated ambient temperature Tout, the outer casing temperature T3, and the device temperatures T4 and T5 according to the present embodiment.

The processing of FIG. 5 is realized when the power of the digital camera 100 has been turned ON and the control unit 101 has loaded the program stored in the nonvolatile memory 116 to the working memory 117 and executed the program to control each component.

In step S501, the control unit 101 reads out, from the nonvolatile memory 116, the estimated ambient temperature Tout that was stored at the end of previous processing. In a case where the nonvolatile memory 116 does not store the estimated ambient temperature Tout at the end of previous processing, the control unit 101 reads out an initial value of the estimated ambient temperature Tout from the nonvolatile memory 116. The initial value is set at 23° C., for example.

In step S502, the control unit 101 obtains the first ambient temperature T1 from the first thermometer 111, and obtains the second ambient temperature T2 from the second thermometer 112. Then, the control unit 101 stores the first ambient temperature T1 obtained from the first thermometer 111 and the second ambient temperature T2 obtained from the second thermometer 112 into the working memory 117.

In step S503, the control unit 101 calculates the estimated ambient temperature Tout based on the first ambient temperature T1 and the second ambient temperature T2 obtained in step S502, and stores the same into the working memory 117. The control unit 101 calculates the estimated ambient temperature Tout by assigning the first ambient temperature T1 and the second ambient temperature T2 obtained in step S502 to the above-described expression 1.

In step S504, the control unit 101 calculates an outer casing temperature threshold T3Ln for each $n^{th}$ operation mode among the plurality of operation modes of the digital camera 100 from the following expression 2, and stores the same into the working memory 117. The control unit 101 calculates the outer casing temperature threshold T3Ln by adding a constant H to the estimated ambient temperature Tout calculated in step S503, and then subtracting a constant δn (where n is any natural number) from the value obtained by adding the constant H to the estimated ambient temperature Tout.

$$\text{Outer casing temperature threshold } T3Ln = \text{estimated ambient temperature } Tout + H - \delta n \quad \text{(Expression 2)}$$

In the above expression 2, the constant H is a fixed value (e.g., 20° C.). The constant δn is a correction value corresponding to the $n^{th}$ operation mode. A method of setting the constant δn will be described later. In this way, the threshold for the outer casing temperature is set in accordance with the estimated ambient temperature. Furthermore, the threshold for the outer casing temperature is set in accordance with an operation mode.

In step S505, the control unit 101 executes shooting preparation processing of the digital camera 100. The control unit 101 starts driving of the image capturing unit 102, and displays image data captured by the image capturing unit 102 as a live view on the display unit 107. As a result, the image capturing unit 102 is activated, and a processing load of the control unit 101 increases; therefore, power consumed by the digital camera 100 and the amounts of heat generation therein increase as well. Upon completion of the shooting preparation processing, shooting of still images or shooting of moving images can be performed; in subsequent steps S506 to S513, the still image shooting processing corresponding to a user operation on the still image shooting button 103, or the moving image shooting processing corresponding to a user operation on the moving image shooting button 106, is executed in parallel.

In step S506, the control unit 101 determines an operation mode of the digital camera 100 based on the setting of the mode dial 104 and the operation state of the still image shooting button 103 or the moving image shooting button 106, and sets the outer casing temperature threshold T3Ln corresponding to the operation mode. In this case, the operation modes of the digital camera 100 include not only the still image shooting mode and the moving image shooting mode, but also a moving image shooting mode for shooting moving images temporarily during the still image shooting mode, a 4K moving image shooting mode or an 8K moving image shooting mode included in the moving image shooting mode, or the like.

In step S507, the control unit 101 stores the outer casing temperature T3 obtained from the third thermometer 113 into the working memory 117.

In step S508, the control unit 101 compares the outer casing temperature threshold T3Ln set in step S506 with the outer casing temperature T3 obtained in step S507. The control unit 101 causes the processing to proceed to step S509 in a case where it has determined that the outer casing temperature T3 is equal to or lower than the outer casing temperature threshold T3Ln, and causes the processing to proceed to step S515 in a case where it has determined that the outer casing temperature T3 is not equal to or lower than the outer casing temperature threshold T3Ln.

In step S509, the control unit 101 stores the fourth device temperature T4 obtained from the fourth thermometer 114 and the fifth device temperature T5 obtained from the fifth thermometer 115 into the working memory 117.

In step S510, the control unit 101 compares the fourth device temperature T4 obtained in step S509 with a fourth device temperature threshold T4L. The fourth device temperature threshold T4L is an upper limit temperature for guaranteeing the operations of the control unit 101, which is a heat source device. The fourth device temperature threshold T4L is a fixed value, and is set at 70° C., for example. The control unit 101 causes the processing to proceed to step S512 in a case where it has determined that the fourth device temperature T4 is equal to or lower than the fourth device temperature threshold T4L, and causes the processing to proceed to step S515 in a case where it has determined that the fourth device temperature T4 is higher than the fourth device temperature threshold T4L.

Also, the control unit 101 compares the fifth device temperature T5 obtained in step S509 with a fifth device temperature threshold T5L. The fifth device temperature threshold T5L is an upper limit temperature for guaranteeing the operations of the image capturing unit 102, which is a heat source device. The fifth device temperature threshold T5L is a fixed value, and is set at 80° C., for example. The control unit 101 causes the processing to proceed to step S512 in a case where it has determined that the fifth device temperature T5 is equal to or lower than the fifth device temperature threshold T5L, and causes the processing to proceed to step S515 in a case where it has determined that the fifth device temperature T5 is not equal to or lower than the fifth device temperature threshold T5L.

Note that although the control unit 101 and the image capturing unit 102 are exemplarily described as the heat source devices for which the determination of step S510 is made in the present embodiment, no limitation is intended by this. In a case where there is a heat source device other than the control unit 101 and the image capturing unit 102, a comparison with a device temperature threshold may be similarly made also with respect to another heat source device.

In step S512, the control unit 101 determines whether the power switch 105 has been switched from ON to OFF. In a case where the control unit 101 has determined that the power switch 105 has been switched from ON to OFF, it causes the processing to proceed to step S513. In a case where the control unit 101 has determined that the power switch 105 has not been switched from ON to OFF, it causes the processing to return to step S506, and continues the processing in accordance with the operation mode of the digital camera 100.

In step S513, the control unit 101 stores the estimated ambient temperature Tout calculated in step S503 into the nonvolatile memory 116.

In step S514, the control unit 101 executes the shutdown processing. Here, for example, the control unit 101 stops a power supply to the image capturing unit 102 and the display unit 107.

In step S515, the control unit 101 stores the estimated ambient temperature Tout calculated in step S503 into the nonvolatile memory 116.

In step S516, the control unit 101 executes processing for restricting the operations of the digital camera 100. Here, for example, the control unit 101 displays, on the display unit 107, information for providing the user with a notification indicating that a shutdown is to be performed as a result of the outer casing temperature T3 reaching the outer casing temperature threshold T3Ln or the device temperature T4 or T5 reaching the device temperature threshold T4L or T5L; then, after a predetermined time period has elapsed since the display, shutdown processing similar to that of step S514 is executed.

According to the present embodiment, the threshold for the outer casing temperature T3 (hereinafter, the outer casing temperature threshold) for restricting the operations of the digital camera 100 is set for each of the operation modes of the digital camera 100. For example, in the still image shooting mode in which power consumed by the heat source devices is lower than that in the moving image shooting mode and which does not affect the temperature increase of the outer casing temperature T3 and heat generation of the heat source devices, the outer casing temperature threshold T3L is set at a temperature higher than the outer casing temperature threshold T3L in the moving image shooting mode. In this way, even in a case where the operations have been restricted as a result of the outer casing temperature T3 reaching the outer casing temperature threshold T3L in the moving image shooting mode, the user can execute shooting of still images by setting the digital camera 100 to the still image shooting mode after turning the power of the digital camera 100 ON again.

<Method of Setting Outer Casing Temperature Threshold T3Ln>

Next, a method of setting a correction value On used in calculation of the outer casing temperature threshold T3Ln in step S504 of FIG. 5 will be described. A correction value on is a value for correcting the outer casing temperature threshold T3Ln in accordance with consumed power while the digital camera 100 is operating. A correction value on is a constant that is set in proportion to consumed power for each of the operation modes of the digital camera 100.

In the present embodiment, provided that the first operation mode (n=1) is the operation mode with the highest consumed power among the plurality of $n^{th}$ operation modes (where n is a natural number), correction values δn are set so that the correction value δ1 has the largest value; in this way, an outer casing temperature threshold T3L1 is set at the lowest temperature.

As a first example, the moving image shooting mode (first operation mode) and the still image shooting mode (second operation mode) of the digital camera 100 will be described. The outer casing temperature threshold T3L1 in the moving image shooting mode, in which consumed power is higher than that in the still image shooting mode, is set at a temperature lower than an outer casing temperature threshold T3L2 in the still image shooting mode (T3L1<T3L2). Conversely, the outer casing temperature threshold T3L2 in the still image shooting mode, in which consumed power is lower than that in the moving image shooting mode, is set at a temperature higher than the outer casing temperature threshold T3L1 in the moving image shooting mode (T3L2>T3L1).

In this way, even in a case where shooting of moving images cannot be continued as a result of the outer casing temperature T3 of the digital camera 100 reaching the outer casing temperature threshold T3L1 (<T3L2), shooting of still images can be executed until the outer casing temperature T3 reaches the outer casing temperature threshold T3L2 (>T3L1).

In this case, it is desirable that the difference between the outer casing temperature thresholds T3L1 and T3L2 be set in consideration of not only the differences in consumed power among the respective operation modes, but also the form of use of the digital camera 100. For example, the digital camera 100 includes an operation mode in which moving images can be shot temporarily, even during the still image shooting mode, by the user operating the moving image shooting button 106. In such an operation mode, there is a high possibility that the user's main purpose is shooting of still images, rather than shooting of moving images. It is therefore considered that, even if the total consumed power is the same during shooting of moving images and during shooting of still images, it is desirable to set the outer casing temperature threshold T3L1 in the moving image shooting mode lower than the outer casing temperature threshold T3L2 in the still image shooting mode so as to place priority on shooting of still images.

As a second example, the 8K moving image shooting mode (first operation mode) and the 4K moving image shooting mode (second operation mode) of the digital camera 100 will be described. The outer casing temperature threshold T3L1 in the 8K moving image shooting mode, in which consumed power is higher than that in the 4K moving image shooting mode, is set at a temperature lower than the outer casing temperature threshold T3L2 in the 4K moving image shooting mode (T3L1<T3L2). Conversely, the outer casing temperature threshold T3L2 in the 4K moving image shooting mode, in which consumed power is lower than that in the 8K moving image shooting mode, is set at a temperature higher than the outer casing temperature threshold T3L1 in the 8K moving image shooting mode (T3L2>T3L1).

In this way, even in a case where shooting of 8K moving images cannot be continued as a result of the outer casing temperature T3 of the digital camera 100 reaching the outer casing temperature threshold T3L1 (<T3L2), shooting of 4K moving images can be executed until the outer casing temperature T3 reaches the outer casing temperature threshold T3L2 (>T3L1).

The outer casing temperature threshold T3Ln calculated in step S504 of FIG. 5 is a variable that is changed in accordance with the estimated ambient temperature Tout, and a correction value δn is a constant that is set in proportion to consumed power for each of the operation modes of the digital camera 100. Therefore, even if the estimated ambient temperature Tout changes, the difference between the outer casing temperature thresholds T3Ln and T3L(n+1) for the respective operation modes does not change.

In view of this, provided that the operation mode with lower consumed power is the $n^{th}$ operation mode (where n is a natural number) in ascending order from the operation mode of the digital camera 100 with the highest consumed power, the relationship of the following expression 3 is satisfied by the outer casing temperature thresholds T3Ln and T3L(n+1) for the respective operation modes when the estimated ambient temperature Tout has changed.

$$T3Ln < T3L(n+1) \quad \text{(Expression 3)}$$

Also, according to the present embodiment, in a case where the operations of the digital camera 100 are restricted based on the outer casing temperature threshold T3Ln for each operation mode of the digital camera 100, the operations in a mode that has a small effect on the temperature increase can be executed immediately after the operations have been restricted in one operation mode due to the temperature increase in the digital camera 100, regardless of a change in the estimated ambient temperature Tout.

Furthermore, in the present embodiment, as has been described in relation to step S510 of FIG. 5, the operations are restricted also in a case where the device temperatures T4 and T5 obtained for the respective heat source devices have exceeded the device temperature thresholds T4L and T5L set for the respective heat source devices.

As the device temperature thresholds T4 and T5 for the heat source devices are set at fixed values to guarantee the operations of the respective heat source devices, their values remain the same regardless of the operation modes of the digital camera 100 and the estimated ambient temperature Tout. However, as the temperatures of the heat source devices decrease rapidly after the heat source devices have stopped operating as has been described using FIGS. 4A and 4B, the operations that consume low power, such as shooting of still images, can be executed even in a case where the operations that consume high power, such as shooting of moving images, have been restricted; also, the operations that consume low power, such as shooting of moving images at a low frame rate, can be executed even in a case where the operations that consume high power, such as shooting of moving images at a high frame rate, have been restricted.

As described above, according to the present embodiment, even in a case where the operations have been restricted due to the temperature increase in the digital camera 100, the operations in a mode that has a small effect on the temperature increase can be executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203531, filed Dec. 20, 2022 which is hereby incorporated by reference herein in its entirety.

What is claimed is:

1. An electronic apparatus comprising:
- a first thermometer that detects a first ambient temperature in an environment in which the electronic apparatus is used;
- a second thermometer that detects a second ambient temperature in the environment in which the electronic apparatus is used;
- a third thermometer that detects an outer casing temperature of the electronic apparatus;
- a CPU; and
- a memory which stores a program which, when executed by the CPU, causes the electronic apparatus to function as:
- a control unit that sets an operation mode of the electronic apparatus to any of a plurality of operation modes including a first operation mode and a second operation mode,
- wherein a temperature increase in the electronic apparatus in the second operation mode is smaller than a temperature increase in the electronic apparatus in the first operation mode,
- wherein the control unit estimates an ambient temperature based on the first ambient temperature and the second ambient temperature, and restricts an operation of the electronic apparatus in a case where the outer casing temperature has reached a threshold that has been set based on the estimated ambient temperature,
- wherein the control unit changes a temperature of the threshold in accordance with the operation mode of the electronic apparatus such that the threshold is set at a first temperature in a case where the operation mode of the electronic apparatus is set to the first operation mode and the threshold is set at a second temperature higher than the first temperature in a case where the operation mode of the electronic apparatus is set to the second operation mode.

2. The electronic apparatus according to claim 1, wherein power consumed in the second operation mode is smaller than power consumed in the first operation mode.

3. The electronic apparatus according to claim 2, wherein each operation mode of the plurality of operation modes has a corresponding consumed power, and wherein the consumed power of the first operation mode is larger than the consumed power corresponding to any other operation mode of the plurality of operation modes.

4. The electronic apparatus according to claim 1, wherein the electronic apparatus is an image capture apparatus, and
- wherein the first operation mode is a moving image shooting mode, and the second operation mode is a still image shooting mode.

5. The electronic apparatus according to claim 1, wherein the plurality of operation modes have different consumed power, and
- the control unit changes the threshold in accordance with the operation mode of the electronic apparatus so that the higher the consumed power of the operation mode, the lower a temperature is set as the threshold.

6. The electronic apparatus according to claim 1, wherein a difference between the first temperature and the second temperature does not change even if the estimated ambient temperature has changed.

7. The electronic apparatus according to claim 1, further comprising
- a heat source device;
- a fourth thermometer that detects a temperature of the heat source device,
- wherein the control unit restricts the operation of the electronic apparatus in a case where the temperature of the heat source device has reached a temperature threshold for the heat source device.

8. The electronic apparatus according to claim 7, wherein the temperature threshold for the heat source device is set irrespective of operation modes of the electronic apparatus.

9. The electronic apparatus according to claim 1, further comprising:
- a first heat source device;
- a second heat source device;
- a fourth thermometer that detects a temperature of the first heat source device; and a fifth thermometer that detects a temperature of the second heat source device, wherein the control unit restricts the operation of the electronic apparatus in a case where the temperature of the first heat source device detected by the fourth thermometer has reached a temperature threshold for the first heat source device, and in a case where the temperature of the second heat source device detected by the fifth thermometer has reached a temperature threshold for the second heat source device.

10. The electronic apparatus according to claim 9, wherein the CPU is the first heat source device and the second heat source device is an image sensor.

11. The electronic apparatus according to claim 1, wherein the CPU operates as a heat source device in power-on state of the electronic apparatus, the first thermometer is arranged at a position that is at a first distance from the CPU and the second thermometer is arranged at a position that is a second distance from the CPU, wherein the first distance is larger than the second distance.

12. The electronic apparatus according to claim 1, wherein the electronic apparatus is a hand-held type electronic apparatus.

13. A control method for an electronic apparatus, the electronic apparatus including:

a first thermometer that detects a first ambient temperature in an environment in which the electronic apparatus is used;

a second thermometer that detects a second ambient temperature in the environment in which the electronic apparatus is used; and a third thermometer that detects an outer casing temperature of the electronic apparatus, the control method comprising:

setting an operation mode of the electronic apparatus to any of a plurality of operation modes including a first operation mode and a second operation mode, wherein a temperature increase in the electronic apparatus in the second operation mode is smaller than a temperature increase in the electronic apparatus in the first operation mode, estimating an ambient temperature based on the first ambient temperature and the second ambient temperature, and restricting an operation of the electronic apparatus in a case where the outer casing temperature has reached a threshold that has been set based on the estimated ambient temperature, wherein in the restricting, a temperature of the threshold is changed in accordance with the operation mode of the electronic apparatus such that the threshold is set at a first temperature in a case where the operation mode of the electronic apparatus is set to the first operation mode and the threshold is set at a second temperature higher than the first temperature in a case where the operation mode is set to the second operation mode.

14. A non-transitory computer-readable storage medium storing a program for causing a computer to function as an electronic apparatus comprising:

a first thermometer that detects a first ambient temperature in an environment in which the electronic apparatus is used;

a second thermometer that detects a second ambient temperature in the environment in which the electronic apparatus is used;

a third thermometer that detects an outer casing temperature of the electronic apparatus;

a control unit that sets an operation mode of the electronic apparatus to any of a plurality of operation modes including a first operation mode and a second operation mode, wherein a temperature increase in the electronic apparatus in the second operation mode is smaller than a temperature increase in the electronic apparatus in the first operation mode, wherein the control unit estimates an ambient temperature based on the first ambient temperature and the second ambient temperature, and restricts an operation of the electronic apparatus in a case where the outer casing temperature has reached a threshold that has been set based on the estimated ambient temperature, wherein the control unit changes a temperature of the threshold in accordance with the operation mode of the electronic apparatus such that the threshold is set at a first temperature in a case where the operation mode of the electronic apparatus is set to the first operation mode and the threshold is set at a second temperature higher than the first temperature in a case where the operation mode of the electronic apparatus is set to the second operation mode.

15. The electronic apparatus according to claim 1, wherein each operation mode of the plurality of operation modes has a corresponding correction value, and wherein the control unit adds a predetermined value to the estimated ambient temperature to define a generic outer casing temperature threshold and defines a corresponding temperature for the threshold for each operation mode of the electronic apparatus by adjusting the generic outer casing temperature threshold using the corresponding correction value.

16. The electronic apparatus according to claim 15, wherein each correction value is proportional to a consumed power value associated with the corresponding operation mode.

* * * * *